Patented July 28, 1936

2,048,808

UNITED STATES PATENT OFFICE 2,048,808

MOLD FOR PLASTER CASTING

George Oenslager, Akron, Ohio, assignor to The B. F. Goodrich Company, New York, N. Y., a corporation of New York No Drawing. Application April 20, 1935, Serial No. 17,491

5 Claims. (Cl. 18—47)

This invention relates to molds in which compositions such as plaster may be cast. Heretofore plaster articles have commonly been cast in gelatine molds, which when properly prepared are sufficiently resilient that the finished article can be withdrawn readily and without danger of breakage, even though the shape of the article is complicated or even though the mold may contain undercut cavities. Such gelatine molds suffer from several serious disadvantages. The gelatine of which they are made is a hydrophyllic colloid and readily absorbs water from the wet plaster, thereby increasing in volume and decreasing in strength. It also tends to absorb moisture from the air when the atmosphere is humid or to dry out when it is dry. The gelatine molds can therefore be used for casting only a very few articles before they are so changed that they must be discarded. The gelatine contained in the discarded molds cannot be reused to make new molds with the same properties as those made from fresh gelatine, not only because the water content of the reclaimed gelatine is variable and uncertain, but because gelatine changes when heated and is more and more degraded by each reheating to recast the molds.

The molds of this invention are made from a composition which is not only not affected by water or moisture, but which is not appreciably changed by heating to the temperature at which it becomes fluid. This composition in its preferred form consists essentially of a polymerized vinyl chloride which is insoluble in ordinary solvents at room temperatures, dissolved with the aid of heat in a quantity of plasticizer or non-volatile solvent sufficient to reduce it to a resilient gel at room temperatures. Other gel-forming colloids which are unaffected by water, including cellulose nitrate, cellulose acetate and the like can be substituted for the polymerized vinyl chloride if desired, although they do not possess the remarkable chemical stability which makes the polymerized vinyl chloride so valuable for this purpose.

As has been stated, the polymerized vinyl chloride should be in a form which is insoluble at room temperatures, or in other words completely polymerized to form what is sometimes referred to as the gamma polymer. Incompletely polymerized, soluble modifications of polymerized vinyl chloride are not satisfactory because they do not possess the property of forming strong resilient gels, but tend to form masses which are weak, plastic and sticky. The plasticizers used may be any one or several of the compounds which are capable of dissolving the polymerized vinyl chloride or other gel-forming colloid at elevated temperatures to form resilient gels when cooled, and which are insoluble in water. They are in the main non-volatile aromatic liquids, including aromatic halogen derivatives, nitro compounds, amines, ethers, ketones, esters and the like. Many purely aliphatic compounds including mineral oils and fatty oils are unsuitable because they are not solvents for the polymerized vinyl chloride even at elevated temperatures. The most satisfactory plasticizers at present appear to be such aromatic esters as tricresyl phosphate, dibutyl phthalate, benzyl benzoate and the like, all of which are stable, non-toxic and reasonable in cost. The compositions are formed by dissolving the completely polymerized vinyl chloride (the gamma polymer) in powdered form in from five to seven times its weight of the plasticizer at a temperature in the neighborhood of 150° C. When the solution is homogeneous it is cast in master molds in the usual way to form the casting molds. The proportion of plasticizer may be varied within or even beyond the range just specified, the resiliency increasing as the proportion of plasticizer is increased. Six and one-half to seven parts of such a plasticizer as tricresyl phosphate to each part of polymerized vinyl chloride produce a composition of the consistency usually found most useful in plaster casting.

In a modification of the invention a wax is added to the gel-forming composition. For example, if one part of polymerized vinyl chloride is dissolved in seven parts of tricresyl phosphate, and one-half part of Japan wax is added, the final composition is stiffened enough to resist distortion during the plaster casting operation without losing its flexibility. In other words, its resistance to deformation by the small forces caused by contact of the fluid plaster with the mold is greatly increased, while its ability to change its shape in response to the relatively large forces accompanying withdrawal of the finished plaster article from the mold is not greatly changed. Other waxes such as paraffin, beeswax and the like, may be substituted, and the proportion may be increased to equal or even exceed that of the polymerized vinyl chloride. More or less finely divided solids, in the form of powders, granules, fibers, etc. may also be added if desired, but it is generally preferred to use only ingredients which form a homogeneous solution with the gel-forming colloid and the plasticizer at the temperature at which the composition becomes fluid.

The life of the molds made from the preferred compositions outlined above is incomparably greater than that of gelatine molds. They are not affected by atmospheric moisture nor by the water contained in the plaster, and can be used repeatedly until the sharpness of definition of the mold is lost by mechanical wear. Whenever a mold becomes unusable it can readily be recast by simply remelting it at a temperature of 140–160° C. and the recast mold will have the same properties as the original, for the composition of the mold remains unchanged and its properties are not sensibly altered by the heat of remelting.

It will be understood that the molds can be used for casting any plaster or cement which is cast at room temperatures, including not only plaster of Paris, but other gypsum plasters and cements, Portland cement, magnesium oxychloride cements, synthetic marble and the like, or even compositions which are fusible at temperatures well below the boiling point of water. It is to be understood, therefore, that plaster casting as used in the claims refers to the casting of any such compositions which are cast at temperatures not much above room temperature.

I claim:
1. Molds for plaster casting consisting essentially of a resilient gel of completely polymerized vinyl chloride in several times its weight of a plasticizer therefor.
2. Molds for plaster casting consisting essentially of a resilient gel of completely polymerized vinyl chloride, several times its weight of a plasticizer therefor, and a wax.
3. Molds for plaster casting consisting of a gel of completely polymerized vinyl chloride in from five to seven times its weight of a plasticizer therefor.
4. Molds for plaster casting consisting essentially of a resilient gel of completely polymerized vinyl chloride in several times its weight of a non-volatile, liquid aromatic ester.
5. Molds for plaster casting consisting essentially of a resilient gel of completely polymerized vinyl chloride with approximately equal proportions of Japan wax and several times its weight of tricresyl phosphate.

GEORGE OENSLAGER.